US009442286B2

(12) United States Patent
Li et al.

(10) Patent No.: US 9,442,286 B2
(45) Date of Patent: Sep. 13, 2016

(54) SPACED CONFIGURATION OF ACOUSTO-OPTIC DEFLECTORS FOR LASER BEAM SCANNING OF A SEMICONDUCTOR SUBSTRATE

(75) Inventors: Yonggang Li, Chandler, AZ (US); Islam A. Salama, Chandler, AZ (US); Chong Zhang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 13/997,646

(22) PCT Filed: Dec. 22, 2011

(86) PCT No.: PCT/US2011/067001
§ 371 (c)(1),
(2), (4) Date: Jun. 24, 2013

(87) PCT Pub. No.: WO2013/095556
PCT Pub. Date: Jun. 27, 2013

(65) Prior Publication Data
US 2014/0204454 A1  Jul. 24, 2014

(51) Int. Cl.
*G02B 26/08* (2006.01)
*G02F 1/29* (2006.01)
*G02F 1/33* (2006.01)
*G02B 26/10* (2006.01)

(52) U.S. Cl.
CPC .............. *G02B 26/10* (2013.01); *G02F 1/33* (2013.01); *B23K 2201/42* (2013.01); *G02F 2001/291* (2013.01); *G02F 2201/16* (2013.01)

(58) Field of Classification Search
CPC ............ G02F 1/33; G02F 1/113; G02F 1/11; G02F 1/332

USPC .................................................. 359/300-308
See application file for complete search history.

(56) References Cited

U.S. PATENT DOCUMENTS

| 3,531,184 A | 9/1970 | Adler |
| 6,236,479 B1 | 5/2001 | Gosselin et al. |
| 6,587,255 B2 | 7/2003 | Davidson et al. |
| 2002/0191264 A1 | 12/2002 | Vernackt et al. |
| 2004/0056009 A1 | 3/2004 | Gross et al. |

(Continued)

FOREIGN PATENT DOCUMENTS

| CN | 101035646 | 9/2007 |
| CN | 101121221 | 2/2008 |

(Continued)

OTHER PUBLICATIONS

International Search Report and Written Opinion for International Application No. PCT/US2011/067001, dated Jul. 31, 2012, 9 pp. [77.235PCT (ISR & WO)].

(Continued)

*Primary Examiner* — Bumsuk Won
*Assistant Examiner* — Tamara Y Washington
(74) *Attorney, Agent, or Firm* — Blakely, Sokoloff, Taylor & Zafman LLP (57) ABSTRACT

A first acousto-optic deflector receives a laser beam. The first acousto-optic deflector diffracts the received laser beam along a first axis. A second acousto-optic deflector receives the diffracted laser beam. The second acousto-optic deflector diffracts the received diffracted laser beam along a second axis.

27 Claims, 9 Drawing Sheets

(56) References Cited

U.S. PATENT DOCUMENTS

| | | |
|---|---|---|
| 2008/0037596 A1 | 2/2008 | Kobayashi et al. |
| 2008/0279248 A1 | 11/2008 | Sung |
| 2010/0301023 A1 | 12/2010 | Unrath et al. |
| 2011/0210105 A1 | 9/2011 | Romashko et al. |
| 2012/0218623 A1 | 8/2012 | Sandstrom |

FOREIGN PATENT DOCUMENTS

| | | |
|---|---|---|
| JP | 2538589 | 5/1988 |
| JP | 2805064 | 11/1989 |
| JP | 04-037788 | 2/1992 |
| JP | 2005-518659 | 6/2005 |
| JP | 2010-207879 | 9/2010 |
| KR | 10-2008-0013718 | 2/2008 |
| WO | 2006-129369 | 12/2006 |
| WO | WO-2010/076579 | 7/2010 |
| WO | WO-2013/095556 | 6/2013 |

OTHER PUBLICATIONS

Chinese Search Report for CN Counterpart Application No. 201180076303.6, 2 pgs., (Oct. 30, 2015).

PCT Notification of Transmittal of the International Search Report and the Written Opinion of the International Searching Authority, or the Declaration for corresponding PCT Application No. PCT/US/2014/039247, 18 pp., (Feb. 11, 2015).

Office Action from Counterpart KR Patent Application No. 10-2014-7020238, Mailed Aug. 21, 2015, 4 pages.

European Search Report for EP Counterpart Application No. 11878170.7, 6 pgs., (Jul. 30, 2015).

SPACED CONFIGURATION OF ACOUSTO-OPTIC DEFLECTORS FOR LASER BEAM SCANNING OF A SEMICONDUCTOR SUBSTRATE

BACKGROUND

1. Field

The disclosure relates to a method and a system for configuration of acousto-optic deflectors for laser beam scanning.

2. Background

Galvanometer based optical scanners are used to position optical beams for a broad range of industrial, scientific, imaging, and laser applications. Galvanometer based scanners may be referred to as "galvos". A galvo system may be comprised of a galvanometer, one or more mirrors, and servo circuitry for driving the galvo system and controlling the positioning of the one or more mirrors.

Galvo based systems may be used for laser beam scanning and for laser drilling of vias in applications such as integrated circuit design. In integrated circuit design, a via is a small opening in an insulating oxide layer that allows a conductive connection between different layers. Galvo based laser drilling of vias is commonplace in the electronics industry, allowing high density circuits to be made for a range of products. In galvo based laser drilling of vias, laser beams are steered by mechanical movements of mirrors in a galvo based system to drill vias on an insulating dielectric layer or some other material.

The throughput rate for via drilling may be improved by increasing the galvo frequency and through other mechanisms. The galvo frequency is difficult to increase in view of limitations on the speed of mechanical mirror movement in galvo system. The mechanical movement of the mirror also makes it difficult to improve the accuracy of the positioning of the laser beam. As a result, galvo systems may be relatively slow and the accuracy of galvo systems may be limited.

An acousto-optic deflector may also be used to spatially control a laser beam. In the operation of an acousto-optic deflector, the power driving the acousto-optic deflector may be kept a constant level, while the acoustic frequency is varied to deflect the laser beam to different angular positions. In an acousto-optic deflector changes in the angle of direction and the angular position of the laser beam is linearly proportional to the acoustic frequency. If the acoustic frequency is higher, then the diffracted angle is larger.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments, a plurality of acousto-optic deflectors are configured in a via drilling system. A laser beam is diffracted through the plurality of acousto-optic deflectors. The configuration of the plurality of acousto-optic deflectors allows an increase in the range of spatial positioning of the diffracted laser beam beyond that allowed by a single acousto-optic deflector. Additionally, such acousto-optic based laser via drilling systems have greater throughput and accuracy for via drilling, in comparison to galvo systems. In certain embodiments, the acousto-optic deflectors may be configured for laser scanning and other applications besides via drilling.

Figure 1:
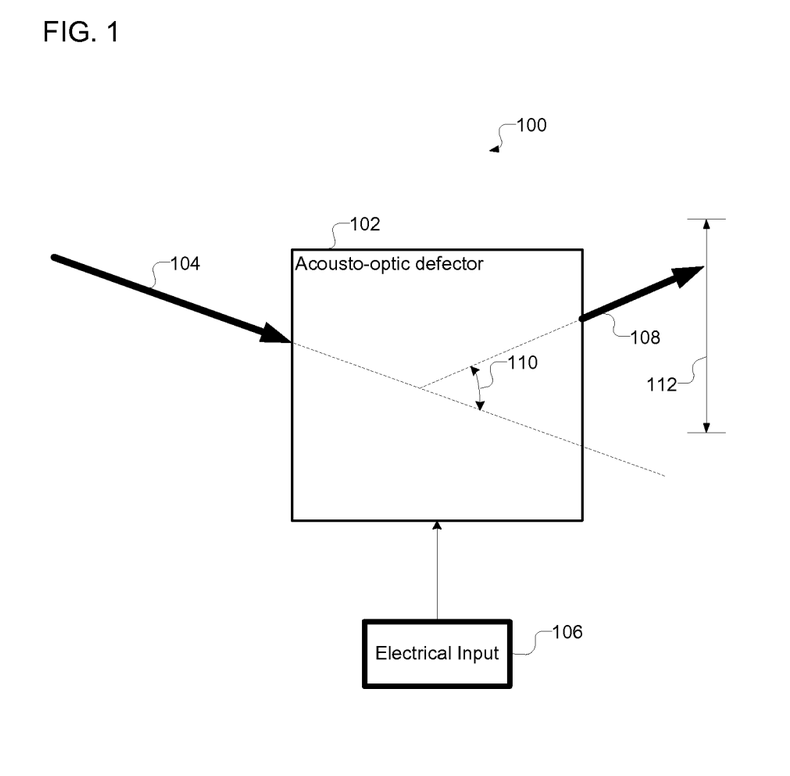
FIG. 1 illustrates a block diagram that shows how an acousto-optic deflector generates an adjustable diffracted beam, in accordance with certain embodiments.

FIG. 1 illustrates a block diagram 100 that shows how an acousto-optic deflector 102 generates an adjustable diffracted beam, in accordance with certain embodiments.

A laser beam 104 is incident on the acousto-optic deflector 102, where the laser beam 104 is referred to as an incident laser beam. Based on electrical inputs 106 applied to the acousto-optic deflector 102, the incident laser beam 104 undergoes diffraction within the acousto-optic deflector and a diffracted laser beam 108 is generated. The angle between the diffracted laser beam 108 and the incident laser beam 104 is shown via reference numeral 110 in FIG. 1, and is referred to as the diffraction angle.

The diffraction angle 110 may be controlled by changing an acoustic frequency within the acoustic-optic deflector 102, by a radio frequency driver included in the electrical input 106. If the acoustic frequency is higher the diffraction angle is higher. However, the range through which the diffraction angle may vary is relatively small, if a single acoustic-optic deflector 102 is used. As a result, in an exemplary embodiment of the acousto-optic deflector 102, the diffracted beam 108 generated from the incident beam 104 may exhibit a limited spatial range (indicated via reference numeral 112) when the diffracted beam is used for via drilling on a substrate and in other applications.

Additionally, the single acousto-optic deflector 102 deflects the incident laser beam 104 along a single dimension. For example, if the two dimensional surface of a substrate is represented by an X-axis (representing a horizontal direction) and a Y-axis (representing a vertical direction) that are orthogonal to each other, then in an exemplary embodiment the acoustic optic defector 102 when placed in a certain position and orientation, may spatially position the diffracted beam in a vertical direction Therefore, FIG. 1 illustrates certain embodiments, in which an acousto-optic deflector 102 exhibits a limited range of one-dimensional spatial positioning of a diffracted laser beam. It may be noted that in the acousto-optic deflector 102, the angle between the incident laser beam and the acoustic wave propagation direction should be close to the Bragg angle to provide the maximum efficiency for the $1^{st}$ order diffracted beam.

Figure 2:
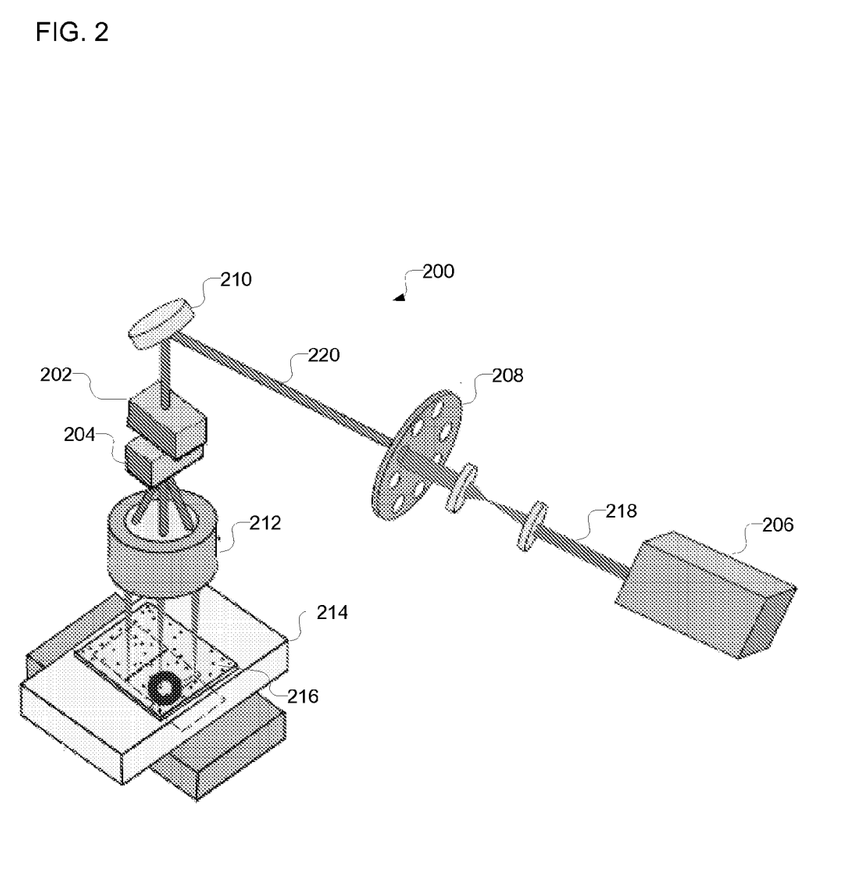
FIG. 2 illustrates a first exemplary laser via drilling system in which a laser beam is diffracted by two acousto-optic deflectors, in accordance with certain embodiments.

FIG. 2 illustrates a first exemplary laser via drilling system 200 in which a laser beam is diffracted by two acousto-optic deflectors 202, 204, in accordance with certain embodiments.

In addition to the two acousto-optic deflectors 202, 204, the first exemplary laser via drilling system 200 is comprised of a laser resonator 206, an aperture mask 208, a mirror 210, a scanning lens 212, and a X-Y table 214 on which a substrate 216 on which vias are drilled is placed.

The laser resonator 206 generates laser beams 218 of certain shapes depending on the requirements of via drilling. The aperture mask 208 defines one or more apertures to shape the laser beam 218 generated by the laser resonator 206 into predefined shapes based on the aperture being used. The mirror 210 optically reflects the shaped laser beam 220 that is generated as a result of the application of the aperture mask 208. The laser beam 220 after being reflected by the mirror 210 undergoes successive diffractions though the two acousto-optic defectors 202, 204, and then passes thorough the scanning lens 212 to drill vias on the substrate 216 that is positioned on the X-Y table 214.

Figure 3:
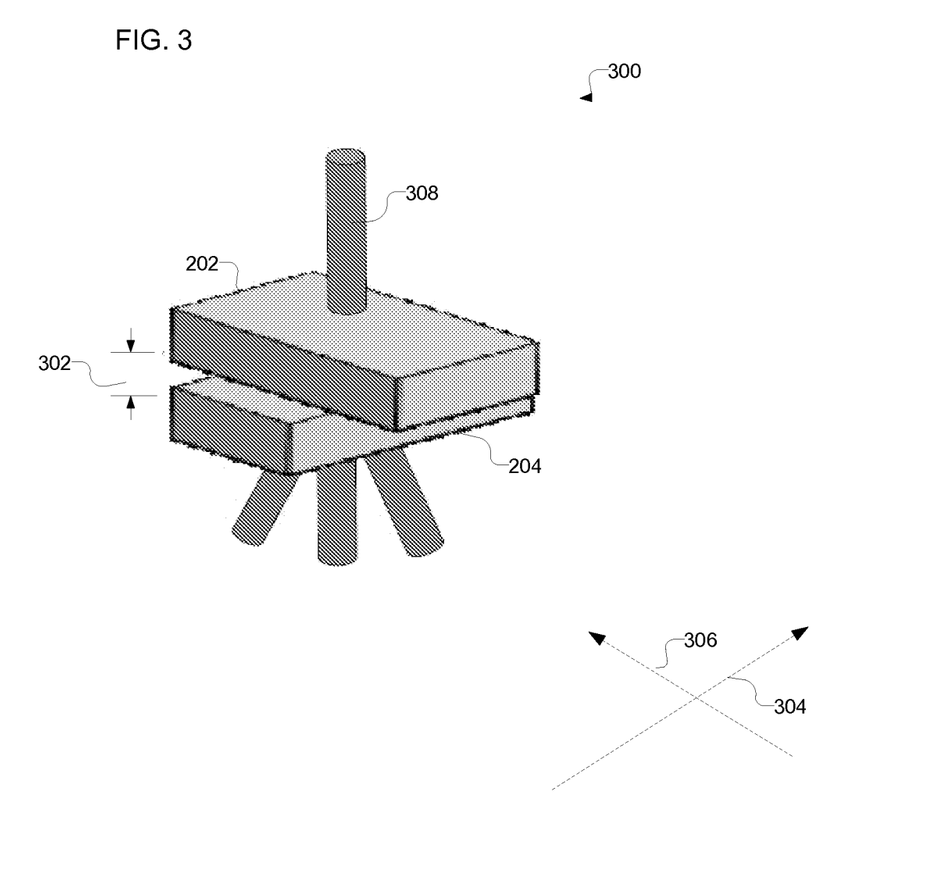
FIG. 3 illustrates an exemplary configuration of the two acousto-optic deflectors in the first exemplary laser via drilling system, in accordance with certain embodiments.

FIG. 3 illustrates an exemplary configuration 300 of the two acousto-optic deflectors 202, 204 in the first exemplary laser via drilling system 200, in accordance with certain embodiments. The exemplary configuration 300 shown in FIG. 3 is a part of the first exemplary laser via drilling system 200 shown in FIG. 2.

It can be seen from FIG. 3 that the acousto-optic deflector 202 is positioned in a configuration in which the acousto-optic deflector 202 is vertically separated by a distance 302 from the acousto-optic deflector 204. If the horizontal surface of the X-Y table 214 is represented two dimensionally by an X-axis 304 and a Y-axis 306, then the acousto-optic deflector 204 is oriented along one axis and the acousto-optic deflector 204 is oriented along the other axis. For example, in certain embodiments the acousto-optic deflector 202 may be oriented along the Y-axis 306, and the acousto-optic deflector 204 may be oriented along the X-axis 304.

In certain embodiments by positioning and orienting the two acousto-optic deflectors 202, 204 in the configuration shown in FIG. 3, the laser beam 308 may be made to undergo deflection in a two-dimensional plane. The acousto-optic deflector 202 that is oriented along the Y-axis 306 deflects the laser beam 308 long the Y-axis 306, and then the acousto-optic defector 204 further deflects (along the X axis 304) the laser beam deflected by the acousto-optic deflector 202. As a result laser beams may be projected on a two dimensional surface for via drilling and other applications.

Figure 4:
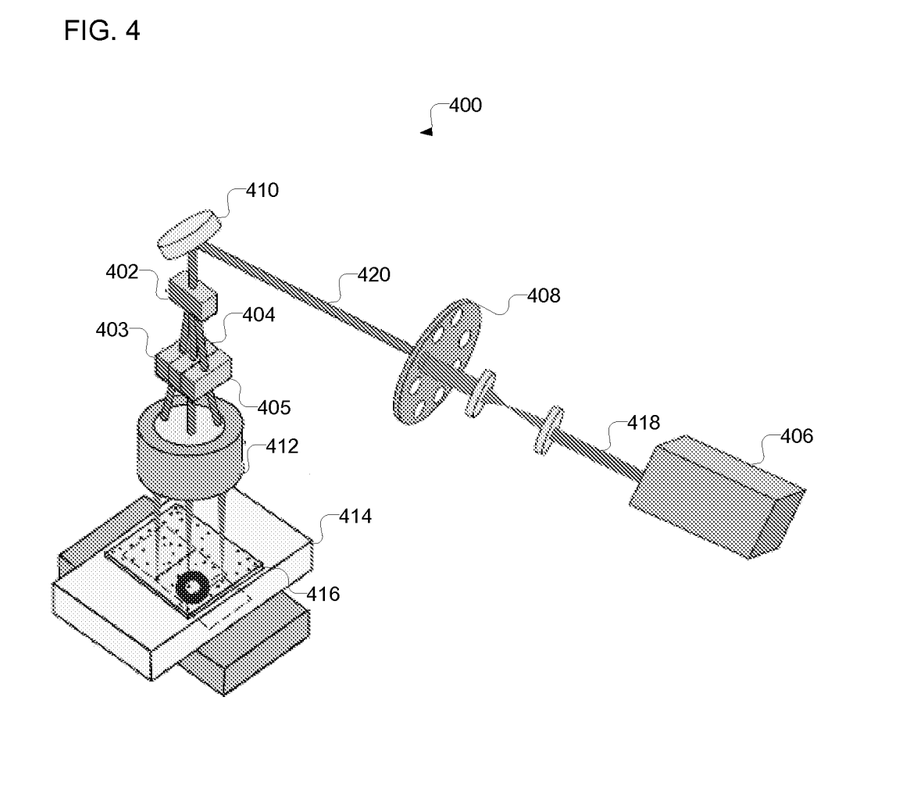
FIG. 4 illustrates a second exemplary laser via drilling system in which a laser beam is first diffracted by a first acousto-optic deflector and then diffracted by one of a plurality of acousto-optic deflectors, in accordance with certain embodiments.

FIG. 4 illustrates a second exemplary laser via drilling system 400 in which a laser beam is first diffracted by a first acousto-optic deflector 402, and then diffracted by one of a plurality of acousto-optic deflectors 403, 404, 405, in accordance with certain embodiments.

In addition to the four acousto-optic deflectors 402, 403, 404, 405, the second exemplary laser via drilling system 400 is comprised of a laser resonator 406, an aperture mask 408, a mirror 410, a scanning lens 412, and a X-Y table 414 on which a substrate 416 on which vias are drilled is placed.

The laser resonator 406 generates laser beams 418 of certain shapes depending on the requirements of via drilling. The aperture mask 408 defines one or more apertures to shape the laser beam 418 generated by the laser resonator 406 into predefined shapes based on the aperture being used. The mirror 410 optically reflects the shaped laser beam 420 that is generated as a result of the application of the aperture mask 408. The laser beam 420 is reflected by the mirror 410 and undergoes successive diffractions first through the acousto-optic deflector 402 and then through one of the three acousto-optic deflectors 403, 404, 405, and then passes thorough the scanning lens 412 to drill vias on the substrate 416 that is positioned on the X-Y table 414.

Figure 5:
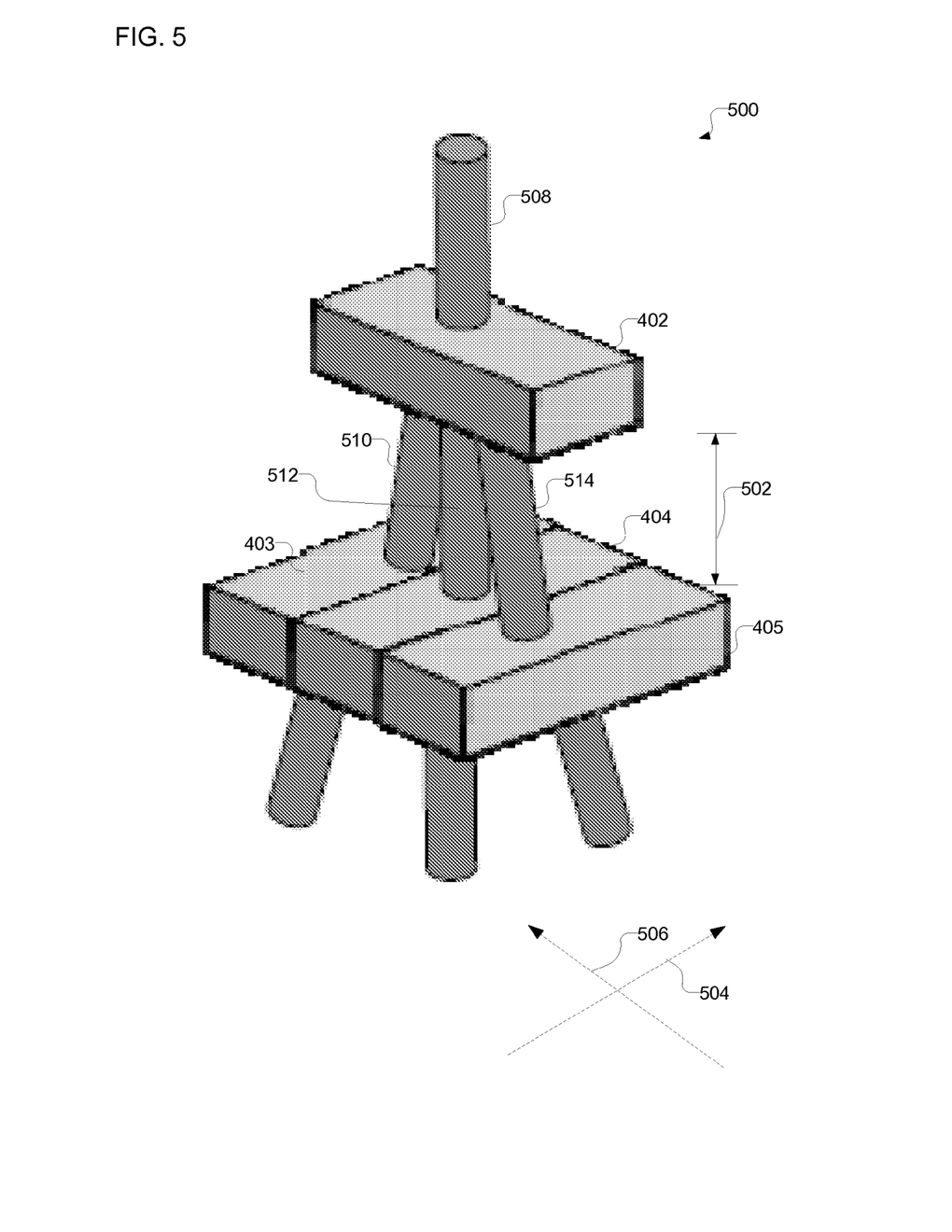
FIG. 5 illustrates an exemplary configuration of acousto-optic deflectors in the second exemplary laser via drilling system, in accordance with certain embodiments.

FIG. 5 illustrates an exemplary configuration 500 of the acousto-optic deflectors 402, 403, 404, 405 in the second exemplary laser via drilling system 400, in accordance with certain embodiments. The exemplary configuration 500 shown in FIG. 5 is a part of the second exemplary laser via drilling system 400 shown in FIG. 4.

It can be seen from FIG. 5, that that three acousto-optic deflectors 403, 404, 405 are positioned below the acousto-optic deflector 402, where the three acousto-optic deflectors 403, 404, 405 are vertically separated from the acousto-optic deflector 402 by a distance 502 that may be zero or more centimeters. If the horizontal surface of the X-Y table 414 is represented two dimensionally by an X-axis 504 and a Y-axis 506, then the acousto-optic deflector 402 is oriented along one axis and the acousto-optic deflectors 403, 404, 405 along the other axis. For example, in certain embodiments the acousto-optic deflector 402 may be oriented along the Y-axis 506 and the acousto-optic deflectors 403, 404, 405 may be oriented along the X-axis 504. While the X-axis 504 and the Y-axis 506 are perpendicular to each other, in alternative embodiments the acousto-optic deflector 402 may be oriented with respect to the acousto-optic defectors 403, 404, 405 at an angle that is different from ninety degrees.

In certain embodiments by positioning the acousto-optic deflectors 402, 403, 404, 405 in the configuration shown in FIG. 5, the laser beam 508 may be made to undergo deflection in a two-dimensional plane. The acousto-optic deflector 402 that is oriented along the Y axis 506 diffracts the laser beam 508 long the Y axis 506 and the diffracted laser beam may then fall on one of the three acousto-optic deflectors 403, 404, 405. For example, for three different electrical inputs 106 applied to the acousto-optic deflector 402, the laser beam 508 may be diffracted differently, and the three diffracted laser beams are shown via reference numerals 510, 512, 514. It may be noted that the diffracted laser beams 510, 512, 514 are all oriented to fall along the Y-axis 506. In the exemplary embodiment shown in FIG. 5, the diffracted laser beam 510 falls on the acousto-optic deflector 403, the diffracted laser beam 512 falls on the acousto-optic deflector 404, and the diffracted laser beam 514 falls on the acousto-optic deflector 405. The diffracted laser beams 510, 512, 514 are then diffracted by the acousto-optic deflectors on which the diffracted laser beam 510, 512, 514 are incident on. For example, the diffracted laser beam 510 is diffracted by the acousto-optic deflector 403 along the X-axis.

The placement of the plurality of electro-optic deflectors 403, 404, 405 causes the laser beams that come out the plurality of electro-optic deflectors 403, 404, 405 to have a greater spatial range, in comparison to the embodiment shown in FIGS. 2 and 3 in which the spatial range of the laser beam that comes of the electro-optic deflector 204 is relatively less, because three electro-optic deflectors 403, 404, 405 positioned and oriented as shown in FIG. 5 are together able to diffract the laser beam that comes out of the electro-optic deflector 402 by a greater angle in comparison to a single electro-optic deflector.

Therefore, FIGS. 4 and 5 illustrate certain embodiments, in which laser beams may not only be projected on a two dimensional surface for via drilling, but the projected laser beams may cover a greater spatial area by using a plurality of acousto-optic deflectors to deflect laser beams along one of the axes.

Figure 6:
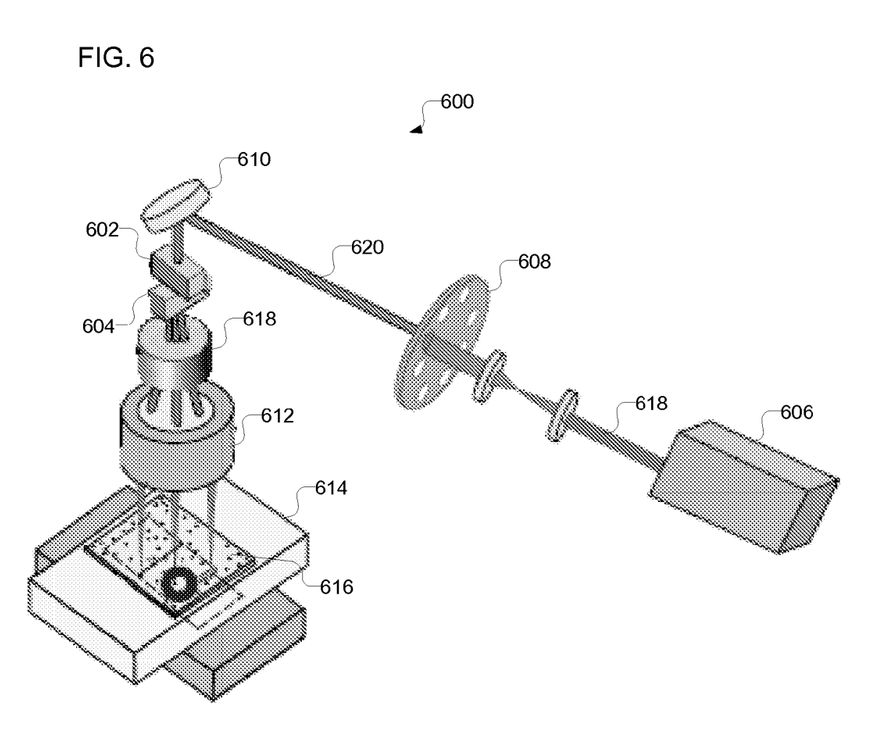
FIG. 6 illustrates a third exemplary laser via drilling system in which a laser beam is diffracted by two acousto-optic deflectors and then transmitted through a magnification optics unit, in accordance with certain embodiments.

FIG. 6 illustrates a third exemplary laser via drilling system 600 in which a laser beam is diffracted by two acousto-optic deflectors 602, 604 and then transmitted through a magnification optics unit 618, in accordance with certain embodiments.

In addition to the two acousto-optic deflectors 602, 604, and the scanning lens 618, the third exemplary laser via drilling system 600 is comprised of a laser resonator 606, an aperture mask 608, a mirror 610, a scanning lens 612, and a X-Y table 614 on which a substrate 616 on which vias are drilled is placed.

The laser resonator 606 generates laser beams 618 of certain shapes depending on the requirements of via drilling. The aperture mask 608 defines one or more apertures to shape the laser beam 618 generated by the laser resonator 606 into predefined shapes based on the aperture being used. The mirror 610 optically reflects the shaped laser beam 620 that is generated as a result of the application of the aperture mask 608. The laser beam 620 that is reflected by the mirror 610 undergoes successive diffractions though the two acousto-optic defectors 602, 604, and then passes thorough the magnification optics unit 618, and then the scanning lens 612, to drill vias on the substrate 616 that is positioned on the X-Y table 614.

Figure 7:
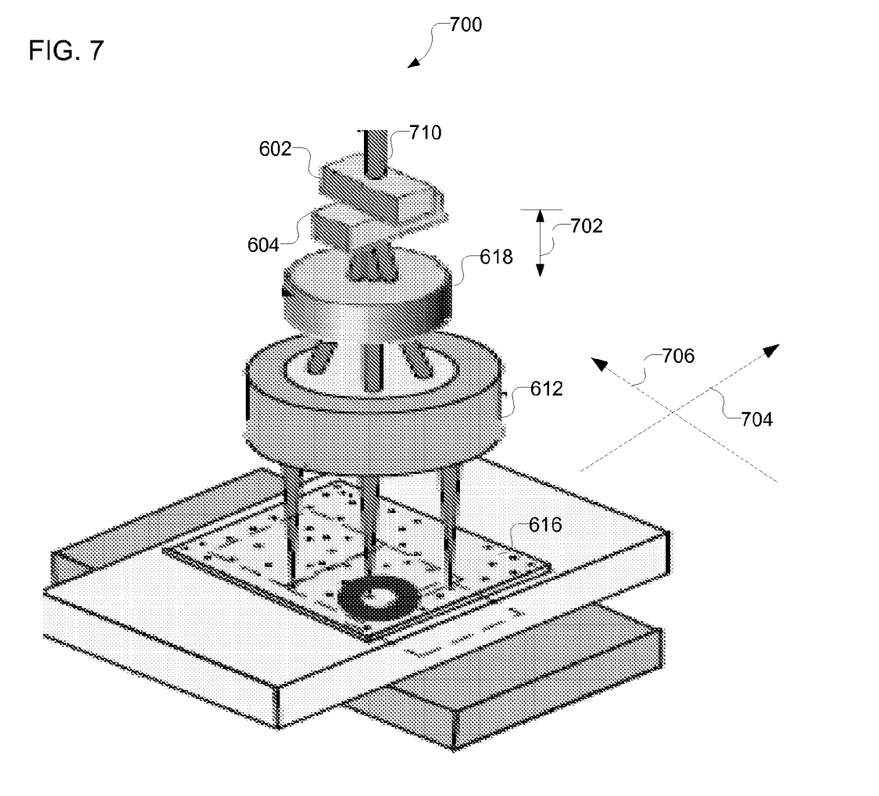
FIG. 7 illustrates an exemplary configuration of the two acousto-optic deflectors and the magnification optics unit, in the third exemplary laser via drilling system, in accordance with certain embodiments.

FIG. 7 illustrates an exemplary configuration 700 of the two acousto-optic deflectors 602, 604 and the magnification optics unit 618, in the third exemplary laser via drilling system 600, in accordance with certain embodiments. The exemplary configuration 700 shown in FIG. 7 is a part of the third exemplary laser via drilling system 600 shown in FIG. 6.

It can be seen from FIG. 7 that the two acousto-optic deflectors 602, 604 are positioned to be vertically separated from each other by zero or more centimeters, and are oriented orthogonal to each other For example, in FIG. 7 the acousto-optic deflector 602 may be oriented along the Y-axis 706 and the acousto-optic deflector 604 may be oriented along the X-axis 704. In alternative embodiments, the acousto-optic deflectors 602, 604 are not orthogonal but may form an angle that is between 80 and 100 degrees.

In certain embodiments by positioning and orienting the two acousto-optic deflectors 602, 604 in the configuration 700 shown in FIG. 7, the laser beam 710 may be made to undergo deflection in a two-dimensional plane. As a result laser beams may be projected on a two dimensional surface for via drilling. However, to increase the spatial area on which the laser beams may be projected on the two-dimensional plane, the magnification optics unit 618 that is placed below the acousto-optic deflector 604 refracts the laser beam that comes out of the acousto-optic deflector 604, where the refraction by the magnification optics unit 618 is caused by optical mechanisms. No diffraction that is controlled by electrical inputs takes place in the magnification optics unit 618. The magnification optics unit 618 may be an optical lens that refracts laser beams and increases the area over which laser beams are allowed to fall.

In the configuration 700 shown in FIG. 7, electrical inputs provided to the acousto-optic deflectors cause the laser beam 710 to be diffracted two times in succession, and then the magnification optics unit 618 refracts the laser beam to make the laser beam fall on the scanning lens 612 and then on the substrate 616 for via drilling. The magnification optics unit 618 through optical refraction causes laser beams to be projected on a larger area in comparison to embodiments in which the magnification optics unit 618 is not used.

Figure 8:
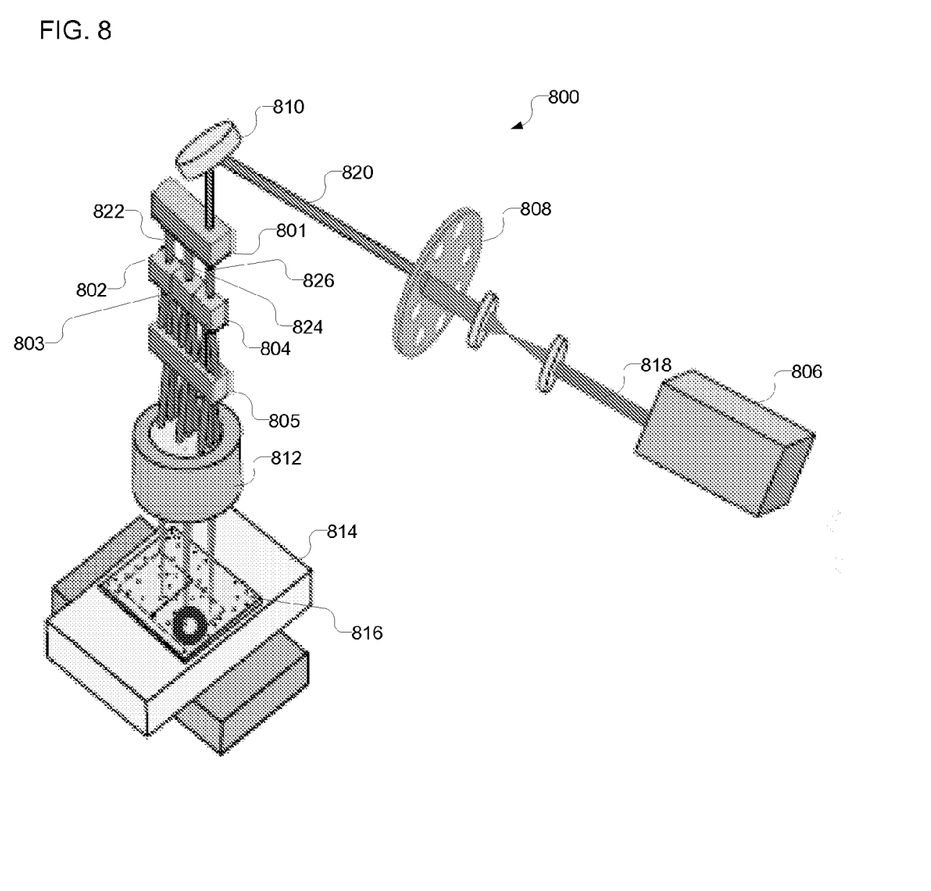
FIG. 8 illustrates a forth exemplary laser via drilling system in which a laser beam is transmitted through a beam splitter or a beam switching device and then diffracted by a plurality of acousto-optic deflectors, in accordance with certain embodiments.

FIG. 8 illustrates a forth exemplary laser via drilling system 800 in which a laser beam is transmitted through a beam splitter 801 and then diffracted by a plurality of acousto-optic deflectors 802, 803, 804, 805, in accordance with certain embodiments. In certain alternatively embodiments, the beam splitter 801 may be replaced by a beam switching device.

In addition to the plurality of acousto-optic deflectors 802, 803, 804, 805, and the beam splitter or beam switching device 801, the fourth exemplary laser via drilling system 800 is comprised of a laser resonator 806, an aperture mask 808, a mirror 810, a scanning lens 812, and a X-Y table 814 on which a substrate 816 on which vias are drilled is placed.

The laser resonator 806 generates laser beams 818 of certain shapes depending on the requirements of via drilling. The aperture mask 808 defines one or more apertures to shape the laser beam 818 generated by the laser resonator 806 into predefined shapes based on the aperture being used. The mirror 810 optically reflects the shaped laser beam 820 that is generated as a result of the application of the aperture mask 808.

The laser beam 820 reflected by the mirror 810 is transmitted and is split into a plurality of laser beams 822, 824, 826 by the beam splitter 806. The plurality of laser beams 822, 824, 826 are generated substantially simultaneously, i.e., at roughly the same time. In certain embodiments in which a beam switching device is used instead of the beam splitter 806, the beam switching device 806 generates the laser beams 822, 824, 826 at successive instants of time. In other words, the beam splitter splits a beam along a spatial dimension, whereas a beam switching device splits a beam along a temporal (i.e., time) dimension.

Each of the plurality of laser beams 822, 824, 826 is then diffracted thorough one acousto-optic deflector. For example laser beam 822 is diffracted through acousto-optic deflector 802, laser beam 824 is diffracted through acousto-optic deflector 803, and laser beam 826 is diffracted through acousto-optic deflector 804. The three diffracted laser beams generated through the acousto-optic deflectors 802, 803, 804 are then deflected along the long axis of the acousto-optic deflector 805.

The acousto-optic deflector 805 deflects the three laser beam along the other axis to track movement of the X-Y table 814. The X-Y table can move continuously with the tracking of acousto-optic deflector 805 to eliminate the table stepping time between acousto-optic deflector fields. The X-Y table 814 can also move in the stepping mode, but in that case the throughput time may be longer.

Therefore, FIG. 8 illustrates certain embodiments, in which a laser beam is split into a plurality of laser beams by a beam splitter or beam switching device and the plurality of beams are diffracted by a plurality of acousto-optic deflectors, and after being made to pass through the scanning lens are employed to drill vias on the substrate 816 that is positioned on the X-Y table 814.

Figure 9:
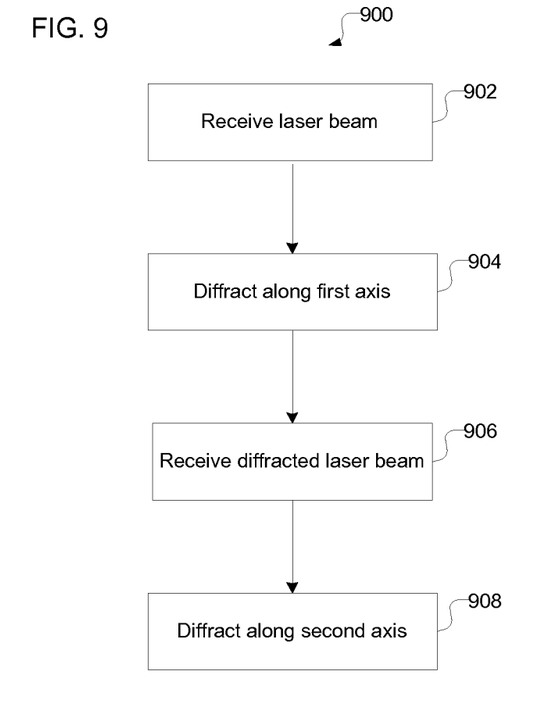
FIG. 9 illustrates a flowchart that shows certain operations, in accordance with certain embodiments.

FIG. 9 illustrates a flowchart 900 that shows certain operations, in accordance with certain embodiments. A first acousto-optic deflector 202 receives a laser beam. The first acousto-optic deflector 202 diffracts the received laser beam along a first axis 306. A second acousto-optic deflector 204 receives the diffracted laser beam. The second acousto-optic deflector diffracts the received diffracted laser beam along a second axis 304.

Therefore, FIGS. 1-9 illustrate certain embodiments in which a plurality of acousto-optic deflectors placed in certain positions and orientations cause laser beams to be diffracted and used for via-drilling on a substrate, laser scanning, or other applications. In certain embodiments, beam splitters or beam switching devices are employed to increase the number of laser beams employed for via-drilling. In certain embodiments, magnification optics is employed to increase the spatial range of laser beams for via drilling beyond that provided by the plurality of acousto-optic deflectors. In certain embodiments, electrical inputs of acousto-optic deflectors are adjusted to change acoustic frequencies of the acousto-optic deflectors to control an angle of diffraction to deflect the laser beam, while avoiding usage of any mechanical moving component to deflect the laser beam.

The components shown or referred to in FIGS. 1-9 are described as performing specific types of operations. In alternative embodiments, the structures components may be structured differently and have fewer, more or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
receiving, by a first acousto-optic deflector, a laser beam;
diffracting. by the first acousto-optic deflector, the received laser beam along a first axis; receiving, by a second acousto-optic deflector, the diffracted laser beam;
diffracting, by the second acousto-optic deflector, the received diffracted laser beam along a second axis, wherein the first acousto-optic deflector and the second acousto-optic deflector are separated by a separation distance in the direction of the diffracted laser beam; and
refracting the diffracted laser beam from the second acousto-optic at by magnification optics and directing the diffracted laser beam to a semiconductor substrate to process the semiconductor substrate.

2. The method of claim 1, wherein:
the first acousto-optic deflector is oriented along the first axis; and
the second acousto-optic deflector is oriented along the second axis that is perpendicular to the first axis.

3. The method of claim 2, wherein the refracted laser beam is to generate vias on the substrate or to expose a photo-resist material on the substrate for laser direct imaging to fabricate a circuit.

4. The method of claim 2, wherein the laser beam is comprised of one or more pulses, the method further comprising:
receiving, by the first acousto-optic deflector, a pulse of the laser beam;
diffracting, by the first acousto-optic deflector, the received pulse of the laser beam, along the first axis;
receiving, by a third acousto-optic deflector that is oriented along the second axis and is separated by the separation distance from the first acousto-optic deflector, the diffracted pulse of the laser beam; and
diffracting, by the third acousto-optic deflector, the received diffracted pulse of the laser beam along the second axis that is perpendicular to the first axis.

5. The method of claim 4, wherein spatial range for laser beams that fall on a substrate to generate vias is greater when both the second and the third acousto-optic deflectors are operational, in comparison to operating the second acousto-optic deflector without operating the third acousto-optic deflector.

6. The method of claim 1, the method further comprising:
adjusting electrical inputs of the first and the second acousto-optic deflectors to change acoustic frequencies within the first and the second acousto-optic deflectors to control an angle of diffraction to deflect the laser beam, while avoiding usage of any mechanical moving component to deflect the laser beam.

7. The method of claim 1, the method further comprising:
generating, the laser beam by a laser resonator;
transmitting the laser beam generated by the laser resonator, through an aperture mask between the laser resonator and the first acousto-optic reflector;
reflecting the transmitted laser beam from the aperture mask by a mirror to fall on the first acousto-optic deflector;
positioning a substrate on a planar surface; and
drilling vias on the substrate by the diffracted laser beam of the second acousto-optic deflector.

8. The method of claim 1 , wherein the laser beam received by the first acousto-optic deflector is one of plurality of laser beams transmitted by a beam splitter, the method further comprising:
while diffracting the laser beam by the first acousto-optic deflector, simultaneously diffracting the other plurality of laser beams by additional acousto-optic deflectors along the first axis to process the semiconductor substrate at least two locations.

9. The method of claim 1 , wherein the laser beam received by the first acousto-optic deflector is one of plurality of laser beams transmitted by a beam switching device, the method further comprising:
after diffracting the laser beam by the first acousto-optic deflector, diffracting the other plurality of laser beams in sequence by additional acousto-optic deflectors along the first axis to process the semiconductor substrate at least two locations.

10. A system, comprising :
a first acousto-optic deflector configured to receive a laser beam, and configured to diffract the received laser beam;
a second acousto-optic deflector coupled to the first acousto-optic deflector, wherein the second acousto-optic deflector is configured to receive the diffracted laser beam, and diffract the received diffracted laser beam along a second axis, wherein the first acousto-optic deflector and the second acousto-optic deflector are separated by a separation the direction of the diffracted laser beam;
magnification optics to refract the diffracted laser beam from the second acousto-optic deflector and to direct the diffracted laser beam to a semiconductor substrate to process the semiconductor substrate.

11. The system of claim 10, wherein:
the first acousto-optic deflector is oriented along the first axis; and
the second acousto-optic deflector is oriented along the second axis that is perpendicular to the first axis.

12. The system of claim 11 wherein the refracted laser beam is to generate vias on a substrate or to expose a photo-resist material for laser direct imaging to fabricate a circuit.

13. The system of claim 11, wherein the laser beam is comprised of one or more pulses, the system further comprising:
a third acousto-optic deflector coupled to the second acousto-optic deflector and oriented along the second axis that is perpendicular to the first axis, wherein the third acousto-optic deflector is separated by the separation distance from the first acousto-optic deflector, wherein:
the first acousto-optic deflector receives a pulse of the laser beam and diffracts the received pulse of the laser beam along the first axis; and
the third acousto-optic deflector is configured to receive the diffracted pulse of the laser beam; and
the third acousto-optic deflector is configured to diffract the received diffracted pulse of the laser beam along the second axis that is perpendicular to the first axis.

14. The system of claim 13, wherein spatial range for laser beams that fall on a substrate to generate vias is greater when both the second and the third acousto-optic deflectors are operational, in comparison to operating the second acousto-optic deflector without operating the third acousto-optic deflector.

15. The system of claim 10, wherein electrical inputs of the first and the second acousto-optic deflectors are adjusted to change acoustic frequencies within the first and the second acousto-optic deflectors to control an angle of diffraction to deflect the laser beam, while avoiding usage of any mechanical moving component to deflect the laser beam.

16. The system of claim 10, wherein a laser resonator generates the laser beam, and the laser beam generated by the laser resonator, is transmitted through an aperture mask between the laser resonator and the first acousto-optic deflector, and the transmitted laser beam from the aperture mask is reflected by a mirror to fall on the first acousto-optic deflector, and wherein a substrate is positioned on a planar surface, and vias are drilled on the substrate by the diffracted laser beam of the second acousto-optic deflector.

17. The system of claim 10, the system further comprising:
additional acousto-optic deflectors; and
a beam splitter, wherein the laser beam received by the first acousto-optic deflector is one of plurality of laser beams transmitted by the beam splitter, and wherein while diffracting the laser beam by the first acousto-optic deflector, diffracting the other plurality of laser beams by the additional acousto-optic deflectors along the first axis.

18. The system of claim 10, the system further comprising:
additional acousto-optic deflectors; and
a beam switching device, wherein the laser beam received by the first acousto-optic deflector is one of plurality of laser beams transmitted by the beam switching device, and wherein after diffracting the laser beam by the first acousto-optic deflector, diffracting the other plurality of laser beams in sequence by the additional acousto-optic deflectors along the first axis.

19. A system for via drilling on a substrate, the system comprising:
a laser resonator configured to generate a laser beam;
an aperture mask coupled to the laser resonator, wherein the aperture mask is configured to transmit the laser beam;
a first acousto-optic deflector configured to receive the laser beam from the aperture mask, and configured to diffract the received laser beam along a first axis;
a second acousto-optic deflector coupled to the first acousto-optic deflector, wherein the second acousto-optic deflector is configured to receive the diffracted laser beam from the first acousto-optic deflector, and diffract the received diffracted laser beam along a second axis, wherein the first acousto-optic deflector and the second acousto-optic deflector are separated by a distance in the direction of the diffracted laser beam; and
a planar surface with the substrate positioned on the planar surface, wherein the diffracted laser beam generated by the second acousto-optic deflector drills a via on the substrate.

20. The system of claim 19, wherein:
the first acousto-optic deflector and the second acousto-optic deflectors are separated by a vertical distance;
the first acousto-optic deflector is oriented along the first axis; and
the second acousto-optic deflector is oriented along the second axis that is perpendicular to the first axis.

21. The system of claim 20, wherein the laser beam diffracted by the second acousto-optic deflector is refracted through magnification optics to generate vias on a substrate, or to expose a photo-resist material for laser direct imaging to fabricate a circuit.

22. The system of claim 20, wherein the laser beam is comprised of one or more pulses, the system further comprising:
a third acousto-optic deflector coupled to the second acousto-optic deflector and oriented along the second axis that is perpendicular to the first axis, wherein the third acousto-optic deflector is separated by the vertical distance from the first acousto-optic deflector, and wherein:
the first acousto-optic deflector receives a pulse of the laser beam and diffracts the received pulse of the laser beam along the first axis; and
the third acousto-optic deflector is configured to receive the diffracted pulse of the laser beam; and
the third acousto-optic deflector is configured to diffract the received diffracted pulse of the laser beam along the second axis that is perpendicular to the first axis.

23. The system of claim 22, wherein spatial range for laser beams that fall on a substrate to generate vias is greater when both the second and the third acousto-optic deflectors are operational, in comparison to operating the second acousto-optic deflector without operating the third acousto-optic deflector.

24. The system of claim 19, wherein electrical inputs of the first and the second acousto-optic deflectors are adjusted to change acoustic frequencies within the first and the second acousto-optic deflectors to control an angle of diffraction to deflect the laser beam, while avoiding usage of any mechanical moving component to deflect the laser beam.

25. The system of claim 19, wherein the laser resonator generates the laser beam, and the laser beam generated by the laser resonator, is transmitted through the aperture mask, and the transmitted laser beam is reflected by a mirror to fall on the first acousto-optic deflector, and wherein vias are drilled on the substrate by the diffracted laser beam of the second acousto-optic deflector.

26. The system of claim 19, the system further comprising:
    additional acousto-optic deflectors; and
    a beam splitter, wherein the laser beam received by the first acousto-optic deflector is one of plurality of laser beams transmitted by the beam splitter, and wherein while diffracting the laser beam by the first acousto-optic deflector, diffracting the other plurality of laser beams by the additional acousto-optic deflectors along the first axis.

27. The system of claim 19, the system further comprising:
    additional acousto-optic deflectors; and
    a beam switching device, wherein the laser beam received by the first acousto-optic deflector is one of plurality of laser beams transmitted by the beam switcher, and wherein after diffracting the laser beam by the first acousto-optic deflector, diffracting the other plurality of laser beams in sequence by the additional acousto-optic deflectors along the first axis.

* * * * *

UNITED STATES PATENT AND TRADEMARK OFFICE
CERTIFICATE OF CORRECTION

PATENT NO. : 9,442,286 B2  
APPLICATION NO. : 13/997646  
DATED : September 13, 2016  
INVENTOR(S) : Li et al.

Page 1 of 1

It is certified that error appears in the above-identified patent and that said Letters Patent is hereby corrected as shown below:

In the Claims

In column 7, at line 51, delete "at".

In column 8, at line 62, after "separation", insert --distance--.

Signed and Sealed this
First Day of November, 2016

Michelle K. Lee
*Director of the United States Patent and Trademark Office*